United States Patent

Anderson et al.

[15] 3,684,897

[45] Aug. 15, 1972

[54] DYNAMIC MOS MEMORY ARRAY TIMING SYSTEM

[72] Inventors: Stanley R. Anderson, Hopewell Junction; Richard W. Bryant, Poughkeepsie; George K. Tu, Wappingers Falls, all of N.Y.

[73] Assignee: Cogar Corporation, Wappinger Falls, N.Y.

[22] Filed: Aug. 19, 1970

[21] Appl. No.: 65,225

[52] U.S. Cl. ..................307/208, 307/214, 307/218, 307/238, 307/269, 307/279, 340/173 FF

[51] Int. Cl. ..........................................H03k 19/08

[58] Field of Search..............307/208, 238, 279, 269; 340/173 R, 173 FF, 173 CA, 173 AM

[56] References Cited

UNITED STATES PATENTS

| | | |
|---|---|---|
| 3,343,130 | 9/1967 | Petschauer et al.....307/238 X |
| 3,518,635 | 6/1970 | Cole et al...............307/238 X |
| 3,541,530 | 11/1970 | Spampinato et al...307/238 X |

OTHER PUBLICATIONS

Pub. I " Random- Access MOS Memory Packs More Bits to the Chip" by Boysel et al., in Electronics dated Feb. 16, 1970, pp. 109- 115.

*Primary Examiner*—Stanley D. Miller, Jr.
*Attorney*—Harry M. Weiss

[57] ABSTRACT

A dynamic MOS memory array timing system. If a mode signal is at a first ("automatic mode") level, a refresh pulse is generated during every cycle defined by the system clock; if the mode signal is at a second ("fast mode") level, a refresh pulse is generated only when a refresh input to the timing system is energized. Where speed is not of the utmost importance, the system can be operated in the automatic mode and there is no need to provide externally controlled refresh input signals. On the other hand, where speed is important, each system cycle can be speeded up by generating refresh signals only periodically; the increased speed is gained at the expense of the additional control circuits required to generate the refresh input signals. Thus the same timing system can be used in many different applications. The timing system utilizes delay elements for generating the many pulses necessary during each cycle. The delay elements are tapped so that fewer separate elements are required. To prevent loading of the delay elements, high-input impedance ECL circuits are used in the timing system. However, to make the system compatible with TTL inputs and outputs, various TTL-ECL and ECL-TTL converter circuits are used throughout the system.

11 Claims, 34 Drawing Figures

INVENTORS
STANLEY R. ANDERSEN
RICHARD W. BRYANT
GEORGE K. TU

BY Amster & Rothstein
Harry M. Weiss
ATTORNEYS

DYNAMIC MOS MEMORY ARRAY TIMING SYSTEM

This invention relates to dynamic MOS memory array timing systems, and more particularly to a timing system in which the refresh operation rate may be varied.

In the copending application of Allen et al. entitled "Dynamic MOS Memory Array Chip," Ser. No. 65,197 , filed on Aug. 19 1970, there is disclosed an array chip wherein each cell includes only four transistor devices and yet all cells can be refreshed simultaneously. During a read or write )data) operation, only one of the select lines is pulsed. A refresh operation, if it is to occur during the same cycle, begins with the generation of a lower level refresh pulse immediately after the select pulse terminates. The refresh pulse is applied to all word lines so that all cells can be refreshed together.

As disclosed in the Allen et al application (which is hereby incorporated by reference), four types of signals must be transmitted to the array chip for its proper operation. The first type of signal consists of address bits for identifying a particular one of the cells in the array to be operated upon during the read or write portion of a cycle. Immediately after the address inputs are stable, the second input — an enable signal — is transmitted to the array chip. The enable pulse is of the same width as the address pulses, but is delayed slightly in time. The enable pulse is required for the proper operation of the decoders which select a particular word line and a particular bit line (to identify the cell at their intersection) in accordance with the address inputs.

A select/refresh (CS) pulse whose leading edge occurs during the enable pulse and whose trailing edge occurs following the termination of the enable pulse is also transmitted to the chip. When the first (select) portion of the select/refresh (CS) pulse is extended to the chip, only one of the word lines is selected and it is pulsed at a high level to control a read or write operation. Immediately thereafter, but only if the cells in the array are to be refreshed during the same cycle, a lower magnitude (refresh) pulse appears on the select/refresh (CS) line. This lower magnitude pulse is applied to all of the word lines and controls the refreshing of all cells in the array. A restore pulse is also generated together with the refresh pulse (the restore pulse, however, terminates after the refresh pulse) in order to prepare the array chip for the next cycle.

In the event a refresh operation is not required during any cycle, the refresh pulse does not follow the select pulse in the select/refresh (CS) signal. Instead, immediately after the select pulse is generated, the CS signal goes low. This allows the restore pulse to be shortened by the desired width.

Thus whenever a refresh operation is not necessary in a cycle, the overall cycle time can be reduced considerably.

In the design of any individual system, a decision is usually made as to what the refresh rate should be. Once the decision is made, the system is designed to refresh the cells at the selected rate. Generally speaking, it is not possible to use the same memory system in different applications where different refresh rates are desired.

For a manufacturer, however, it would be desirable to provide a memory system which can be operated in at least two different modes. Many users do not require a fast memory. Such users can take advantage of a system in which the refresh pulses are generated automatically, e.g., during every system cycle. Although the refresh pulses which occur during every cycle necessarily reduce the speed of the system, the users need not bother with generating external signals which control when the refresh operations take place. On the other hand, many users require maximum speed. For them, a "fast" mode of operation is necessary — refresh pulses are not automatically generated, each system cycle is thus shorter, and when a refresh pulse is necessary it is controlled by an external signal.

It is a general object of our invention to provide a timing system for generating the signals necessary to operate a dynamic MOS memory array of the type disclosed in the Allen et al. application, in which the overall system can be operated in different modes in accordance with user requirements.

It is another object of our invention to provide such a timing system which allows the overall memory to be operated in either an automatic mode or a fast mode, refresh pulses in the latter case being controlled by external signals.

In accordance with the principles of our invention, the timing system is provided with a clock input and address inputs. Address bits, under control of the clock pulses, are extended to the array chip and determine which of the word lines and bit lines are pulsed during a data operation. The other two control inputs to the timing system are a "mode" signal and a "refresh in" signal. When the mode signal is at the "automatic" level, the timing system functions to generate a refresh pulse during every system cycle following a data operation. On the other hand, when the mode signal is at the "fast" level, the timing system does not automatically generate refresh pulses and the restore pulse generated during each cycle is relatively short. Only when a "refresh in" pulse is received does the timing system generate a refresh pulse and at the same time extend the width of the restore pulse. Thus if the user wishes to utilize the overall memory system in the automatic mode, the mode input is simply tied to a fixed potential of one level. Nothing need be done in connection with the refresh input. On the other hand, if the system is to be operated in the fast mode, the mode conductor is simply tied to a fixed potential of another level, and a refresh signal is supplied to the timing system during only those cycles when a refresh pulse is to be generated.

The system requires the generation of numerous pulses, delayed from each other by predetermined durations of time. The leading and trailing edges of the various pulses can be controlled by delay lines, but one of the problems with the use of such delay lines is that the packages in which they are contained are relatively large and take up considerable space on a circuit board. For this reason, it is better to utilize tapped delay lines since in this way several discrete delays can be obtained from a delay element included in a single package. However, in a timing system designed to interface with TTL inputs and TTL outputs, it is dangerous to connect taps on a delay line to the inputs of TTL circuits. Typically, the input impedance of a TTL circuit is relatively low and can load the delay line. The negative reflections which result can generate undesirable noise on the line that can cause spurious outputs from the sensing circuits. For this reason, in the illustrative embodiment of the invention, tapped delay lines are utilized but the TTL inputs are converted to ECL levels prior to their application to the delay lines, ECL (high-input impedance) sensing circuits are used, and the outputs of these circuits are converted to TTL signal levels at the output of the timing system.

It is a feature of our invention to provide a timing system for a dynamic MOS cell array which, depending upon an input mode signal, can control the generation of refresh pulses automatically during predetermined system cycles (every cycle, rather than every second, third, etc., in the illustrative embodiment of the invention) or during only those system cycles identified by an externally generated signal.

It is another feature of our invention to utilize tapped delay lines in the timing system for generating various pulses, with TTL input levels being converted to ECL signal levels for application to the delay lines and the signals derived from the delay lines being converted to TTL signal levels at the output of the timing system.

Further objects, features and advantages of our invention will become apparent upon consideration of the following detailed description in conjunction with the drawing, in which:

FIGS. 2A–7B depict specific circuits which can be utilized for the blocks shown in FIG. 1;

Figure 1:
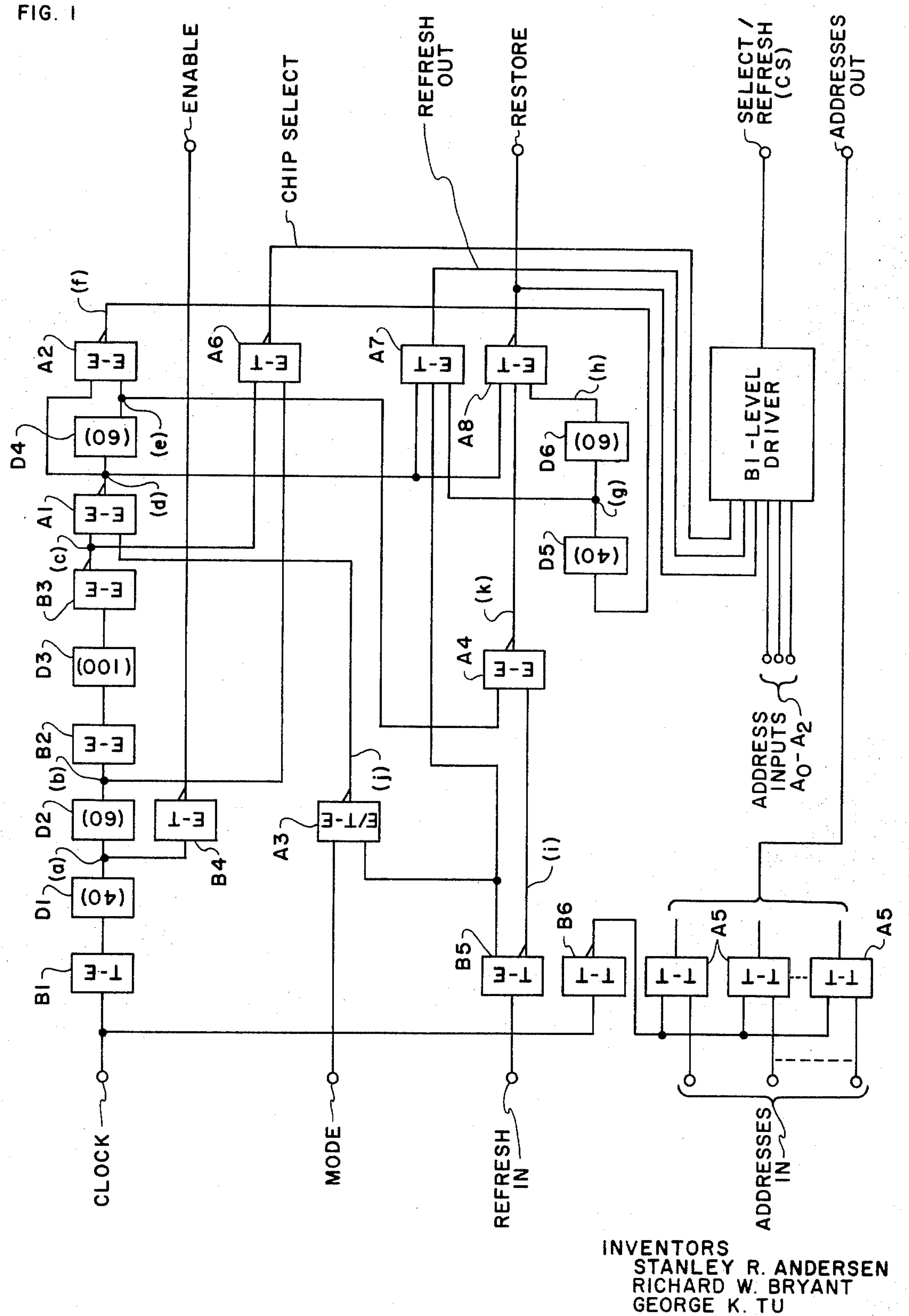
FIG. 1 depicts a block diagram schematic of an illustrative embodiment of our invention.

The system of FIG. 1 comprises a number of different types of circuit. Circuits such as B1 and B2 function as buffers. Circuits such as A1 and A2 function as AND gates. Elements such as D1 and D2 are delay lines. Each of the buffers and gates is of a particular type such as T-E (TTL-ECL), E-E (ECL-ECL), etc. A circuit such as B1 which is of a T-E type, accepts TTL input signal levels (voltage levels of 0.3 and 3.5 volts) and generates ECL voltage levels at its output (approximately 1.5 and 2.55 volts in the illustrative embodiment of the invention).

Before proceeding with a description of the system of FIG. 1, it is necessary to understand how each of the individual circuit elements operates. FIGS. 2A–7A depict block diagram circuits of the types shown in FIG. 1, while FIGS. 2B–7B are detailed circuit schematics for each of the block circuits. All of the circuit elements depicted in FIG. 1 can be constructed from the circuits shown in FIGS. 2B–7B.

Figures 2A, 2B, 3A, 3B, 4A, 4B:
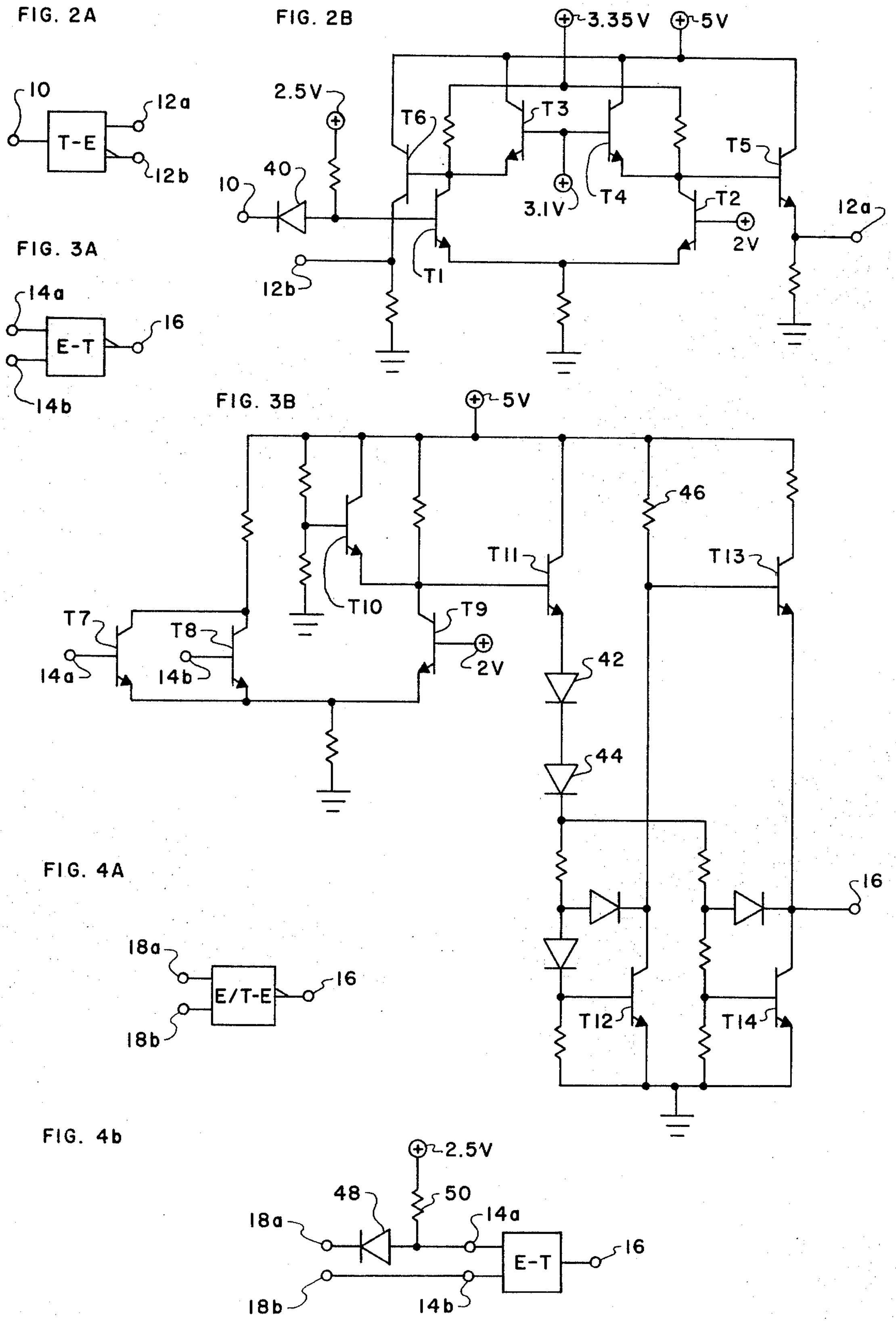

The T-E buffer element shown in FIG. 2A is designed to accept TTL inputs at terminal 10 and to generate an in-phase ECL output at terminal 12*a* and an out-of-phase ECL output at terminal 12*b*. Referring to FIG. 2B, the anode of diode 40 is connected through a resistor to a 2.5-volt potential source. When a low (0.3 volts) TTL input signal appears at terminal 10, diode 40 conducts and the potential at the base of transistor T1 is equal to the input potential plus the 0.8-volt drop across diode 40; thus the potential at the base of transistor T1 is 1.1 volts. Transistors T1 and T2 comprise a conventional ECL current switch. Since the base of transistor T2 is connected to a 2-volt potential source, when the base of transistor T1 is at 1.1 volts, transistor T1 does not conduct while transistor T2 turns on. On the other hand, when a high TTL signal (3.5 volts) appears at terminal 10, diode 40 is reverse biased and a 2.5-volt potential is extended to the base of transistor T1. Since the base of transistor T1 is at a higher potential than the base of transistor T2, transistor T1 conducts to the exclusion of transistor T2.

Whichever one of transistors T1 and T2 conducts, the respective one of transistors T3 and T4 serves as a clamp to prevent the collector voltage of the conducting transistor from dropping too low. Since the base of each of transistors T3 and T4 is at 3.1 volts and the drop across the base-emitter junction is 0.8 volts, the collector of the conducting one of transistors T1 and T2 cannot fall below 2.3 volts. This prevents transistors T1 and T2 from saturating and thus allows the circuit to operate at higher switching speeds.

Suppose that the TTL input is low and transistor T2 is conducting. Since transistor T4 clamps the collector voltage of transistor T2 at 2.3 volts and the collector is connected to the base of transistor T5, transistor T5 conducts. Since the base-emitter drop across transistor T5 is 0.8 volts, the potential appearing at in-phase output terminal 12*a* is 1.5 volts, the low ECL signal level. Since at this time transistor T1 is off, its collector is at a potential of 3.35 volts. Transistor T6 conducts, and since the base-emitter drop across it is also 0.8 volts, the emitter potential of the transistor appearing at the out-of-phase output terminal 12*b* is 2.55 volts — a high ECL signal level.

On the other hand, if the TTL input at terminal 10 is high, transistor T1 conducts rather than transistor T2 and the opposite potentials appear at terminals 12*a* and 12*b*.

The circuit of FIGS. 2A and 2B functions as a buffer to convert a TTL input signal to in-phase and out-of-phase ECL signal levels. As such, the circuit can be used for elements B1 and B5 in FIG. 1. With respect to element B1, since only an in-phase output is required, the signal appearing at terminal 12*b* is not utilized.

The circuit of FIG. 3A is an AND gate of the E-T type. Two ECL input signals are applied at terminals 14*a* and 14*b*. If both input signals are low, a high TTL signal appears at output terminal 16. On the other hand, if either one or both of the inputs are high, a low signal appears at the output.

FIG. 3B depicts schematically a circuit which operates as described. Only if both ECL input signals at terminals 14*a* and 14*b* are low (1.5 volts) does transistor T9 conduct since its base is connected to a potential source of 2 volts. Transistor T10 clamps the voltage at the collector of transistor T9 so that it does not fall to that low a level which would result in the saturation of transistor T9. The low potential at the collector of transistor T9 prevents transistor T11 from conducting. Consequently, since the emitter of transistor T11 feeds the base of transistor T12 and the base of transistor T14, both of these transistors remain off. However, the 5-volt potential is extended through resistor 46 and the base-emitter junction of transistor T13 to output terminal 16 at which a high TTL signal appears.

If one or both of the input signals is high (2.55 volts) one or both of transistors T7 and T8 conducts and transistor T9 remains off. The 5-volt source potential appears at the collector of transistor T9 and forward biases the base-emitter junction of transistor T11. The emitter potential is DC shifted by diodes 42 and 44 and applied to the bases of transistors T12 and T14. With transistor T12 conducting, the base of transistor T13 is shorted through the transistor to ground and thus remains off. Thus transistor T13 remains off while transistor T14 turns on. The output potential at terminal 16 is a low TTL signal (equal to the small drop across transistor T14). The advantages of the circuit of FIG. 3B are described in the copending application of Bryant et al. entitled "ECL-to-TTL Converter," Ser. No. 65,224 , filed on Aug. 19, 1970.

The circuit of FIGS. 3A and 3B can be used for buffer B4 in FIG. 1, and gates A6 and A8. Although gate A8 has three inputs, the circuit of FIG. 3B can be converted to a 3-input gate simply by providing an additional transistor in parallel with transistors T7 and T8. As for buffer B4, although it has only one input, this simply requires that one of transistors T7 and T8 be omitted from the circuit of FIG. 3B.

Gate A7 in FIG. 1 is similar to gates A6 and A8 except that its output is in-phase, that is, its output is negative if and only if all three inputs are negative. An in-phase signal can be derived simply by connecting the base of transistor T11 and the emitter of transistor T10 in FIG. 3B to the collectors of transistors T7 and T8. A third input transistor would also have to be added to the circuit to accommodate the three input signals.

FIG. 4A depicts an AND gate of the E/T-E type in which the output at terminal 16 is high only if the input signals at both of terminals 18*a* and 18*b* are low. This circuit is required for element A3 in FIG. 1. FIG. 4B shows the circuit for accomplishing the function represented by the block of FIG. 4A. The circuit includes an E-T AND gate of the type depicted in FIG. 3A. Terminal 18*b* is connected directly to terminal 14*b*; one of the two inputs to the gate of FIG. 4A is an ECL input and consequently it can be connected directly to the base of one of transistors T7 and T8 in FIG. 3B. The other input to the gate of FIG. 4A is a TTL input. When the input is low (0.3 volts), diode 48 is forward biased and the potential at terminal 14*a* is below the low ECL level of 1.5 volts. On the other hand, when the TTL input at terminal 18*a* is high (3.5 volts) diode 48 is reverse biased and the 2.5-volt potential is extended through resistor 50 to terminal 14*a* (the base of transistor T7 or T8 in FIG. 3B). Diode 48 and resistor 50 simply convert a TTL input to an ECL input, the circuit being the same as the circuit connected to the base of transistor T1 in FIG. 2B.

Figure 5A:
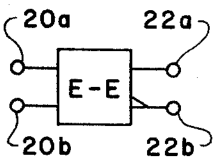

FIG. 5A shows an E-E type AND gate having inphase and out-of-phase outputs. Low ECL signals at both of terminals 20*a* and 20*b* cause the output at terminal 22*a* to be a low ECL level and the output at terminal 22*b* to be a high ECL level. If either or both of the inputs at terminals 20*a* and 20*b* are high (2.55 volts), terminal 22*a* is at the high ECL output level while terminal 22*b* is at the low ECL level (1.5 volts).

Figure 5B:
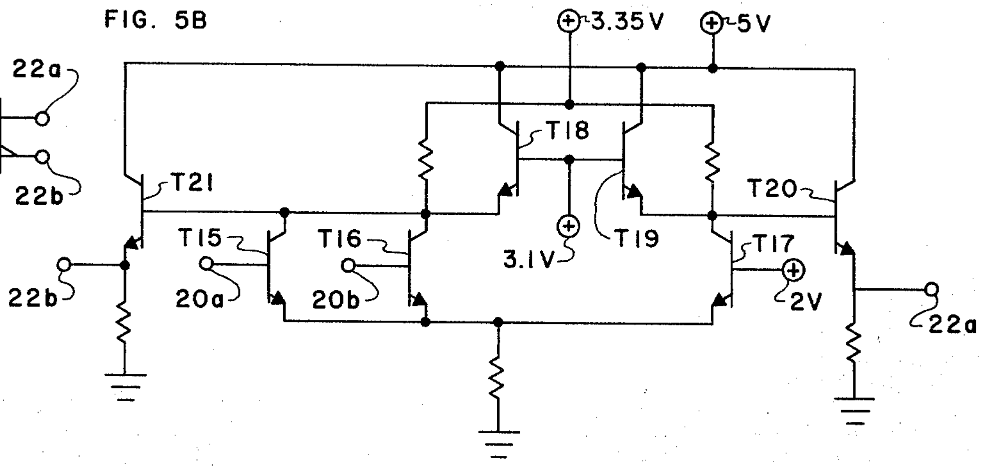

A circuit for accomplishing the function of the block illustrated in FIG. 5A is shown in FIG. 5B. The circuit is very similar to that of FIG. 2B except that two transistors in parallel — T15 and T16 — are substituted for transistor T1 of FIG. 2B. Only if both inputs at terminals 20*a* and 20*b* are low do both of transistors T15 and T16 remain off, thereby allowing transistor T17 to conduct. The functions of transistors T17–T21 are comparable to the functions of respective transistors T2–T6 in FIG. 2B. The major difference between the circuits of FIGS. 2B and 5B is that in the former transistor T1 is actually controlled by a TTL input, while the two paralleled transistors T15 and T16 in FIG. 5B are directly controlled by ECL inputs.

The circuit of FIGS. 5A and 5B can be used for blocks B2, B3, A1, A2 and A4 in FIG. 1. In each case, if there is only one input shown for a respective gate in FIG. 1, the circuit of FIG. 5B would have no connections made to one of terminals 20*a* or 20*b*. Similarly, since in all of the E-E circuits of FIG. 1 only one output is required, the output from the circuit of FIG. 5B would be taken from respective terminal 22*a* or 22*b* in each case.

Figure 6A:
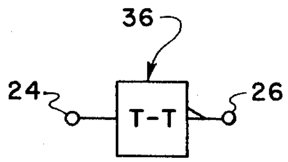
Figure 6B:
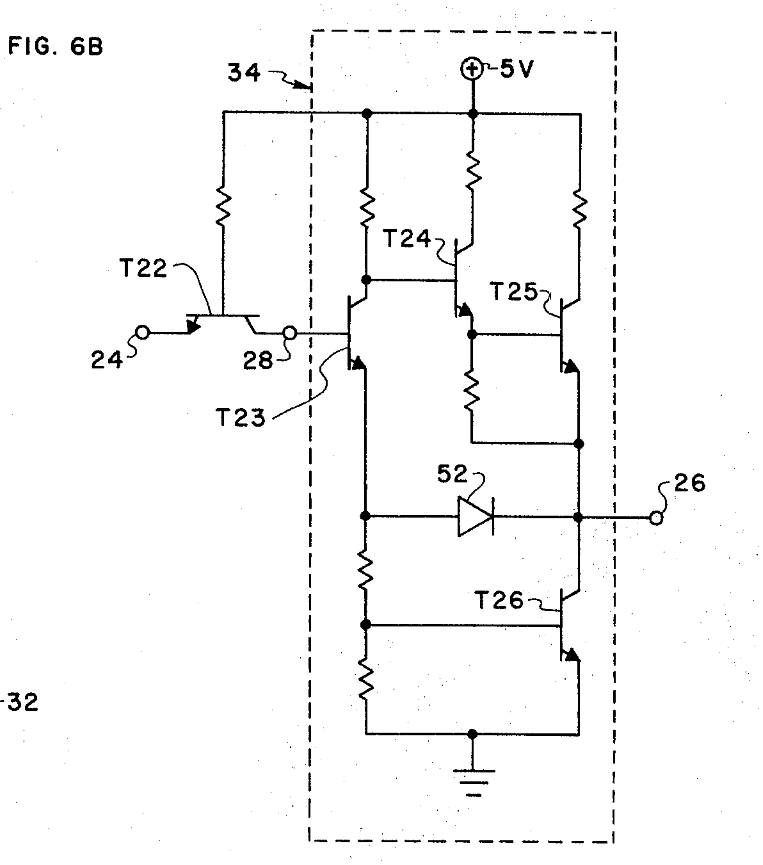

FIG. 6A depicts a TTL-to-TTL inverter circuit 36; a high TTL level at input terminal 24 results in a low TTL level at output terminal 26, and a low input at the input terminal results in a high level at the output terminal. FIG. 6B depicts a circuit for accomplishing this function, the circuit including an input transistor T22 whose collector is connected to terminal 28, and a circuit 34 which includes a transistor T23 whose base is connected to terminal 28. With a low (0.3 volts) input at terminal 24, the base-emitter junction of transistor T22 is forward biased. With a 0.8-volt drop across the junction, the base of the transistor is at 1.1 volts. In order for transistors T23 and T26 to turn on, a 0.8-volt potential must appear across the base-emitter junction of each of the transistors. Since the 1.1-volt potential at the base of transistor T23, even if extended to its collector, is insufficient for turning on both transistors T23 and T26, they both remain off. The 5-volt source potential is extended through the base-emitter junctions of transistors T24 and T25 to output terminal 26. with a 0.8-volt drop across each of the base-emitter junctions, the output potential is at the high TTL level of 3.4 volts.

When the input level at terminal 24 is high (3.4 volts), the base-emitter junction of transistor T22 is again forward biased. With the base of the transistor at a potential 0.8 volts higher than that of the emitter, the base potential is 4.2 volts. The leakage current through transistor T22 causes transistors T23 and T26 to conduct, and terminal 26 is shorted through transistor T26 to ground. The output potential at terminal 26 is thus at a low TTL level.

The circuit of FIGS. 6A and 6B can be used for buffer B6 in the system of FIG. 1.

Figure 7A:
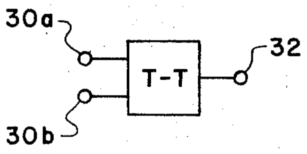
Figure 7B:
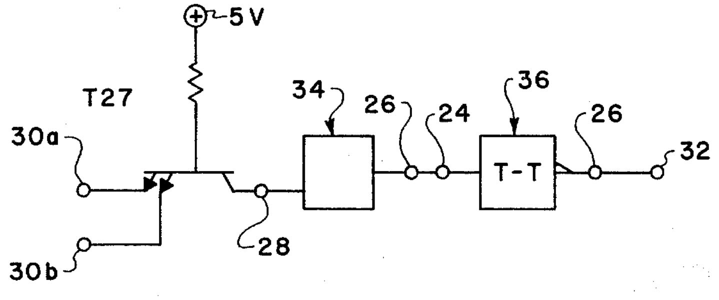

FIG. 7A depicts an AND gate. When the signals at both of terminals 30*a* and 30*b* !are at high TTL levels, the signal at output terminal 32 is similarly high. On the other hand, if either input is low, the output is low. FIG. 7B depicts a circuit for constructing the AND gate of FIG. 7A. The circuit includes a double-emitter transistor T27 whose collector is connected to terminal 28. Between terminals 28 and 26 is the circuit shown at 34 in FIG. 6B. The output stage of the overall circuit includes block 36 of FIG. 6A.

Transistor T27 functions as does transistor T22 in FIG. 6B except that the potential at terminal 28 is high only if both inputs are high; if either input is low, the base of transistor T27 is at a potential of 1.1 volts, which potential is insufficient to cause leakage current to flow through transistor T27 for turning on transistor T23 in circuit 34. Circuit 36 functions to invert the signal level as does the circuit of FIGS. 6A and 6B. Consequently, the potential at terminal 32 is high only if both input levels are high. The circuit of FIGS. 7A and 7B can be utilized for AND gates A5 in the system of FIG. 1.

Figure 8:
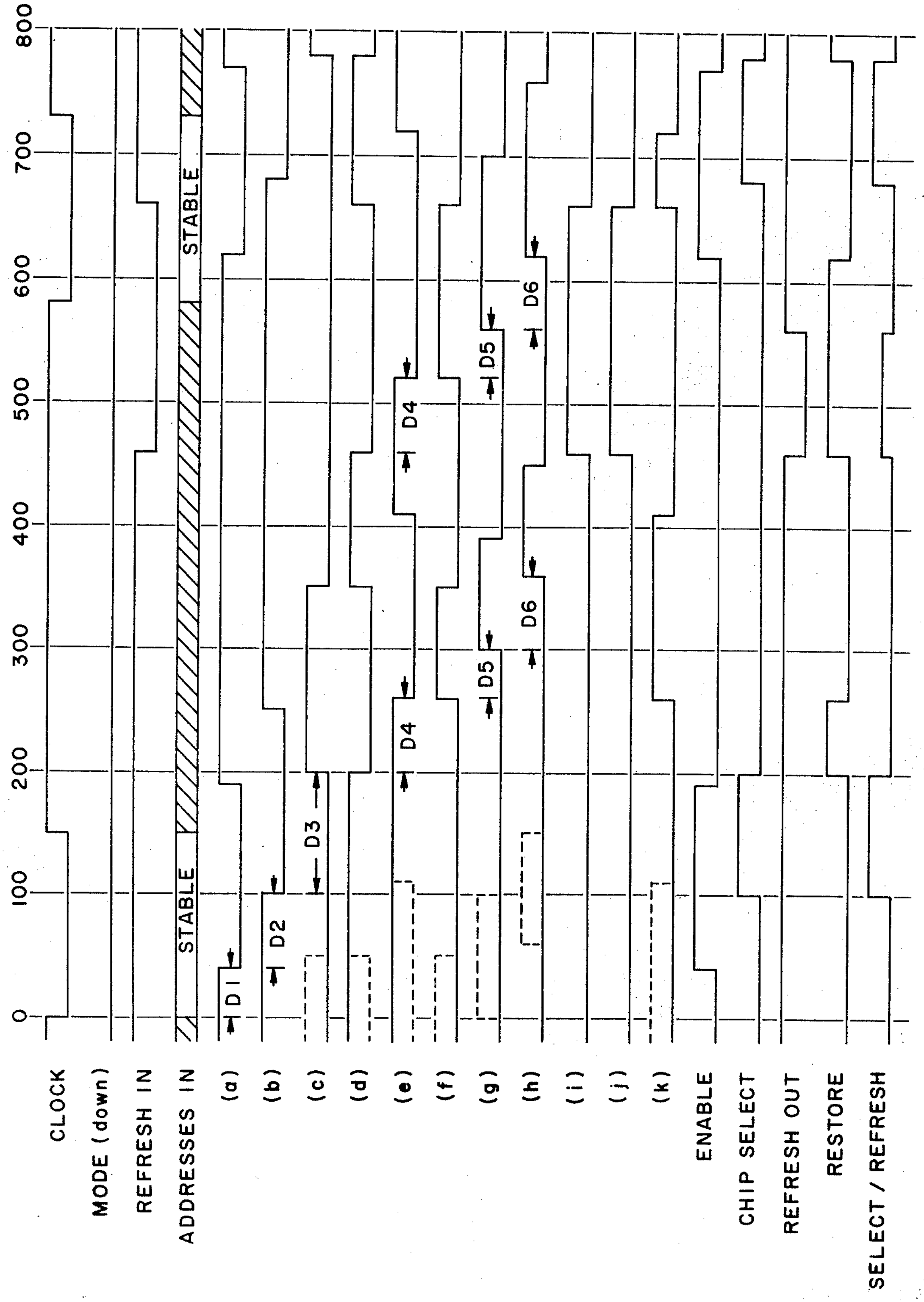
FIG. 8 is a timing diagram which will be helpful in understanding the fast mode of operation.

FIG. 8 depicts the timing sequence of the various waveforms produced by the system of FIG. 1 when the system operates in the fast mode, that is, where refresh pulses are not generated during every system cycle. It is assumed that each system cycle requires 300 nanoseconds. The first cycle starts at time 0 (all references to time hereinafter are with respect to nanoseconds) when the clock pulse goes low. The clock pulse remains low for 150 nanoseconds and then goes high. Ordinarily, the clock pulse goes low again at time 300 to start another cycle. The various pulses produced following the leading edge of each clock pulse do not terminal until some time after the cycle. Thus, waveform (*k*) is shown as a containing pulse extending between times 260 and 410; while the pulse begins before the end of a first cycle, it terminates during the next cycle. For this reason, various dashed pulses are shown in waveforms (*c*), *d*), (*e*), (*f*), (*g*), (*h*) and (*k*); these pulses represent the pulses generated as a result of a previous cycle.

When it is necessary to have a refresh operation, for the system to operate properly there must be some delay between the last data operation and the refresh operation. The data operation cycle in FIG. 8 extends between time 0 and time 300. Were another data operation to occur immediately thereafter, the clock pulse would go low at time 300. However, since FIG. 8 shows a data operation followed by a refresh operation, the clock pulse does not go low and instead the refresh input goes low at time 460. This signals the start of a refresh operation. Another system read/write cycle does not begin until time 580 when the clock input goes low once again.

The address bits which are extended to gates A5 must be stable between times 0 and 150. It is during this interval, co-extensive with the clock pulse, that each of the address inputs must be high or low depending on the particular cell in the array chip to be accessed. The negative clock pulse is inverted by buffer B6 and a positive potential is thus applied to one input of each of gates A5. Those address input bits which are high in potential cause the respective signal on the address output conductor to be high, while those which are low in potential result in low signals on the respective output conductors. The output address bits, extended to the inverter and decoder circuits on the array chip, cause a particular cell on the chip to be selected.

The mode input is low in potential when the system is operated in the fast mode. (The mode input does not generally change in any given application.) As will be described below, this results in the generation of refresh pulses only when the refresh input goes low to indicate that a refresh pulse is required.

The negative clock pulse is extended through buffer B1 to the input of delay D1. Delay D1 delays the pulse by 40 nanoseconds and thus waveform (*a*) consists of a 150-nanosecond pulse which is delayed with respect to the clock pulse by 40 nanoseconds. This pulse is extended directly to the input of buffer B4. This buffer inverts the signal and also translates it from ECL levels to TTL levels so that the array chip can be driven by TTL pulses. The enable pulse (required by the Allen et al memory array chip) is the first input needed following the address inputs.

The output of delay D1 is also extended to the input of delay D2 (as will be explained below, delay elements D1 and D2 can be included in the same package with the input of buffer B4 being connected to a tap of a single delay line). Delay D2 delays the clock pulse by an additional 60 nanoseconds as shown in waveform (*b*). The pulse is then extended through buffer B2 to delay D3 which delays the signal by an additional 100 nanoseconds. The delayed signal is then transmitted through buffer B3 which inverts it so that a positive pulse appears at its output. The leading edge of the positive pulse occurs at time 200 — the cumulative delays of elements D1, D2 and D3. Since the initial clock pulse has a duration of 150 nanoseconds, the leading edge of the pulse at the output of buffer B3 occurs at time 200, and each system cycle has a duration of 300 nanoseconds, it is apparent that the pulse at the output of buffer B3 extends into the first 50 nanoseconds of the next system cycle. This is shown by the dashed pulse at the start of waveform (*c*) in FIG. 8.

Signal (*c*) is applied to one input of gate A1. The other input of this gate is connected to the output of gate A3. During the fast mode of operation, the mode input is low in potential and thus one input of gate A3 is down. The refresh input, applied to the input of buffer B5, is initially high and thus the in-phase output of the buffer is high. This in-phase output is applied to the second input of gate A3. Because the out-of-phase output of gate A3 is high only if both inputs are low, and one input is high, the output (*j*) of gate A3 is low during every system cycle (except when a refresh pulse is generated, as will be described below). The low signal at the output of gate A3 is applied to the second input of gate A1. The out-of-phase output (*d*) of gate A1 is high only if both inputs are low. Since one input is always low (except when a refresh pulse is to be generated), waveform (*d*) is high only when waveform (*c*) is low, This is shown in FIG. 8 — waveform (*d*) is low only where waveform (*c*) is high (except during a refresh operation, as will be described below).

The output of gate A1 is extended through delay D4 so that waveform (*e*) is the same as waveform (*d*) except that it is delayed by 60 nanoseconds as shown in FIG. 8. The two inputs to gate A2 are waveforms (*d*) and (*e*). The output (*f*) of gate A2 is high only when both inputs are low. Referring to FIG. 8, waveform (*f*) is high only between times 260 and 350. Thus, waveform (*f*) goes high at the end of each cycle and remains high for the first 50 nanoseconds of the next cycle as shown by the dashed waveform in FIG. 8.

Waveform (*f*) is delayed by delay element D5 for 40 nanoseconds to produce waveform (*g*). This signal is applied to one input of gate A7 and is also delayed by 60 nanoseconds by delay element D6 to produce waveform (*h*), applied to one input of gate A8. It should be noted that waveforms (*g*) and (*h*) each consists of a 90-nanosecond pulse and both of them actually occur after each system cycle, that is, each clock pulse eventually results in the generation of pulses (*g*) and (*h*) during the next cycle. During each cycle, a pulse occurs in waveform (*g*) and (*h*) at the beginning of the cycle as a result of the clock pulse generated at the start of the previous cycle.

When the system is operating in the fast mode, the refresh input remains high initially as shown in FIG. 8. Thus the in-phase output of buffer B5 remains high, while the out-of-phase output (*i*) remains low. This out-of-phase signal is applied to one input of gate A4. The other input to the gate is the signal at point (*e*). The output of gate A4 (waveform (*k*)) is high only when both inputs are low. Since waveform (*i*) is low throughout the fast mode of operation, waveform (*k*) is high only when waveform (*e*) is low (except during a refresh operation) as shown in FIG. 8.

Of the various output waveforms, the enable waveform is derived as described above — the enable waveform is a TTL signal delayed from the clock pulse by 40 nanoseconds and inverted in polarity. The chip select signal is derived from the out-of-phase output of gate A6. This chip select signal is high only when both inputs to the gate are low, that is, only when waveforms (*b*) and (*c*) are low. Thus the chip select signal is high only between times 100 and 200. The chip select signal is one of the inputs to the bi-level driver. The bi-level driver is of the type disclosed in the co-pending application of George K. Tu entitled "Bipolar Driver for Dynamic MOS Array Chip," Ser. No. 65,226 , filed on Aug. 19, 1970. The function of the bi-level driver will be described below.

The refresh output from gate A7 is low only when all three inputs are low. One of the inputs to gate A7 is the in-phase output of buffer B5 which is always high during the fast mode of operation except when a refresh pulse is to be generated. Consequently, the refresh output is high as shown in FIG. 8 during successive system cycles. The refresh output is a second of the inputs to the bi-level driver.

The restore output from gate A8, extended both to the array chip and the bi-level driver, is high only when all three inputs are low. The three inputs to gate A8 are waveforms (*d*), (*k*) and (*h*). The only time that all three of these signals are low is between times 200 and 260. Consequently, a 60-nanosecond restore pulse is generated toward the end of each cycle when the system is operated in the fast mode. (Although in the various applications referred to above, 70-nanosecond restore pulses are described, it is to be understood that the present analysis of the system of FIG. 1 does not take into account propagation delays through the various buffers and gates. If such delays are taken into account, it will be apparent to those skilled in the art that the actual times when the various pulses are generated are not exactly as depicted in the waveforms of FIG. 8. The various delays, however, do not affect the operation of the memory chip except that various functions take place at slightly different times.)

For the proper operation of the Allen et al. memory array chip, the following signals are required in sequence:

1. Ten address bits must be extended to the chip to identify one of the 1,024 cells on the chip into which a bit is to be written or from which a bit is to be read.
2. A positive enable signal must be transmitted to the chip for the various decoders to operate properly; the leading edge of the enable signal occurs shortly after the address signals are extended to the chip and the trailing edge of the enable signal occurs when the address bits are no longer extended to chip.
3. A select/refresh (CS) signal, derived by a bi-level driver, is extended to the chip. This signal consists of two parts — a select pulse and a lower-level refresh pulse. The select pulse is shorter than the enable pulse and is delayed slightly. (The exact duration is not critical.) The select pulse causes one of the cells in the array to be operated upon. The refresh pulse, if it is generated, causes all of the cells in the array to be refreshed. When the system is operated in the fast mode, during most of the cycles of operation refresh pulses are not generated. Consequently, the CS signal simply consists of a select pulse during each 300 nanosecond cycle. It is only during each cycle when the system is operated in the automatic mode that a refresh pulse always follows the select pulse.
4. A restore pulse is extended to the chip immediately after the select pulse terminates. The restore pulse prepares the array chip for another cycle of operation. A restore pulse is required in every cycle, whether or not a refresh pulse is generated. If a refresh pulse is generated, the restore pulse is generated together with it but does not terminate until some time after the refresh pulse terminates. If the refresh pulse is not generated, the restore pulse is generated alone, but since there is no refresh pulse the restore pulse can be shorter in duration.

The enable, restore, and address signals derived by the system of FIG. 1 are extended directly to the Allen et al. memory chip array. Referring to the waveforms of FIG. 8, it will be seen that in each cycle that address signals occur first, the enable signal is delayed slightly with respect to them, and the restore pulse occurs towards the end of the cycle. The select/refresh (CS) signal is derived by a bi-level driver circuit and extended to the memory array chip. A bi-level driver suitable for use in the overall system is disclosed in the above-identified Tu application. As disclosed in that application, the inputs to the bi-level driver consist of chip select, refresh and restore signals, as well as three address bits. (The address bits control the selection of a memory array chip, while the other ten address bits extended through gates A5 on FIG. 1 control the selection of a particular cell on a selected chip.) As disclosed in the Tu application, when the chip select signal is high together with address hits $A_0$–$A_2$, a high-level select pulse is generated. This is shown in FIG. 8 with the select/refresh signal going high together with the chip select pulse. There are two other inputs to the Tu bi-level driver — a refresh input and a restore input.

When the refresh input goes low and the restore input goes high, a lower-level refresh pulse is generated. Since the refresh output is ordinarily high when the system is operated in the fast mode, a refresh pulse is not generated in every cycle. Thus, as shown in FIG. 8, a select pulse is generated between times 100 and 200, and is followed by a 60-nanosecond restore pulse. The cycle time is only 300 nanoseconds and no refresh pulses are generated.

Whenever a refresh pulse is to be generated, the clock signal is left high at the end of a system cycle; the clock signal does not go low 300 nanoseconds after it last went low. Instead, the refresh input goes low 160 nanoseconds after the end of the last cycle and the clock signal goes low once again 580 nanoseconds after the start of the last cycle. This is shown in FIG. 8, with the clock signal going low at time 580 to initiate a new read/write cycle. The reason for the extra delay between the last data operation and the start of the refresh operation is that various ones of the pulses actually triggered by each clock pulse are not generated until after a system cycle is completed. It is necessary for these pulses to have terminated before the refresh operation begins.

The mode signal remains down since this signal is permanently down whenever the system is operated in the fast mode. The refresh input, however, goes low at time 460 and remains low for 200 nanoseconds. When the refresh input goes low (160 nanoseconds after the end of the last cycle of operation) it is an indication that a refresh operation is to take place. It is the refresh input going low that actually causes the refresh pulse to be generated (see the select/refresh waveform of FIG. 8, where the refresh pulse is lower in magnitude than the select pulse). The clock pulse which occurs at time 580 simply initiates another data operation sequence.

The address inputs are stable during the time that the second clock pulse is generated as shown in FIG. 8. It should be noted that the refresh input pulse actually overlaps the clock pulse and the address inputs. As will become apparent, the refresh operation is completed before another select pulse is actually generated to control a data operation.

Waveforms (*a*), (*b*), and (*c*) are the same for the second cycle as they are for the first. The refresh input has no effect on the signals inasmuch as they are controlled by delay elements D1, D2 and D3 operating on the clock pulse. With respect to waveforms (*d*), however, it will be recalled that when the refresh input was high signal (*j*) was low. Since signal (*j*) is coupled to one input of gate A1, waveform (*d*) was high whenever waveform (*c*) was low. During a refresh cycle, however, the refresh input goes low and the in-phase output of buffer B5 goes low. Consequently, the out-of-phase output of gate A3, waveform (*j*), goes high while the refresh pulse is generated. This causes the output of gate A1 to go low for the duration of the refresh pulse. Consequently, while waveform (*d*) goes high at time 350, it does not remain high. As shown in FIG. 8, the signal goes low for the duration of the refresh pulse.

Waveform (*e*) is the same as waveform (*d*) except that it is delayed by 60 nanoseconds as shown in FIG. 8. Waveform (*f*) is high whenever waveforms (*d*) and (*e*) are both low. The pulse at the output of gate A2 generated during each read/write cycle extends between times 260 and 350 as shown in FIG. 8. However, when a refresh operation is required, the pulse is lengthened because waveform (*d*) stays low until the refresh input pulse terminates. As shown in FIG. 8, the positive (*f*) pulse extends from 520 nanoseconds to 660 nanoseconds when the cells in the array are to be refreshed.

Waveform (*g*) and waveform (*h*) are the same as waveform (*f*) except that they are delayed respectively by 40 and 100 nanoseconds.

Ordinarily, signal (*i*) is low since the refresh input is high. However, signal (*i*) goes high when the refresh pulse appears at the input of buffer B5. Similar remarks apply to waveform (*j*). As for waveform (*k*), it is high only when waveforms (*i*) and (*e*) are low. The overlap of these two signals, when they are both low, is relatively short following the generation of a refresh pulse input, and is shown in FIG. 8; waveform (*k*) 660 and 720.

The enable pulse is generated in the conventional manner to control a read or write operation immediately after the refresh operation — the enable pulse is derived from waveform (*a*) and is thus delayed from the clock pulse by 40 nanoseconds. The chip select pulse is derived from waveforms (*b*) and (*c*) and since these waveforms are not affected by the fact that the refresh input goes low, the chip select pulse is generated in the conventional manner. It is the chip select pulse (together with the address inputs extended to bi-level driver) which control the generation of the select pulse in the last waveform in FIG. 8 for controlling a read or write operation.

It is the refresh output and restore waveforms which are different during a refresh operation. The refresh output is ordinarily high; as described above, one of the inputs of gate A7 is connected to the in-phase output of buffer B5 which is ordinarily high. But when the refresh input goes low, this output of buffer B5 similarly goes low. Thus the output of gate A7 goes low for that part of the refresh input pulse when the other inputs to gate A7 are also low. These other inputs are waveforms (*d*) and (*g*). Both of these signals are low between times 460 and 560 and thus a 100-nanosecond refresh pulse is generated.

The Tu bi-level driver operates to generate a low-level refresh pulse whenever the refresh input goes low and the restore input goes high. For this reason it is necessary that the restore input also go high while the refresh output goes low. The restore signal goes high whenever its three inputs — waveforms (*d*), (*k*) and (*h*) — are low. These three waveforms are low between times 460 and 620 and thus the restore signal is high during this interval as shown in FIG. 8. It is only during the overlap of the refresh output being low and the restore output being high that the refresh pulse is generated as shown in FIG. 8; the Tu bi-level driver controls the generation of a low level refresh pulse, the advantages of which are described in the Allen et al. application.

During a refresh cycle, when the refresh input goes low it must result in the generation of a refresh output pulse and a restore output pulse. But the restore output pulse can be generated only when signal (*h*) is low. Signal (*h*) is generated between times 360 and 450 following the leading edge of a clock pulse. Thus when a refresh operation is to be controlled, in order that the restore output pulse go high together with the refresh input going low, the refresh input should not be applied to the input of buffer B5 until signal (*h*) has gone low. It is for this reason that the refresh input is not generated until 460 nanoseconds after the leading edge of the last clock pulse — 10 nanoseconds after signal (*h*) has gone low. It is because signal (*h*) is high until 450 nanoseconds after the leading edge of each clock pulse that there is a delay between the end of a read or write operation and the start of a refresh operation.

It is thus apparent that when the system is operated in the fast mode, each cycle has a duration of 300 nanoseconds, while an additional 280 nanoseconds are required (between times 300 and 580 in FIG. 8) whenever a refresh operation is necessary. Since refresh pulses are needed only at widely separated intervals, the overall system operation is relatively fast. However, the increase in speed is gained only at the cost of providing a source of refresh input signals with the concomitant timing circuits for controlling the periodic generation of these pulses.

Figure 9:
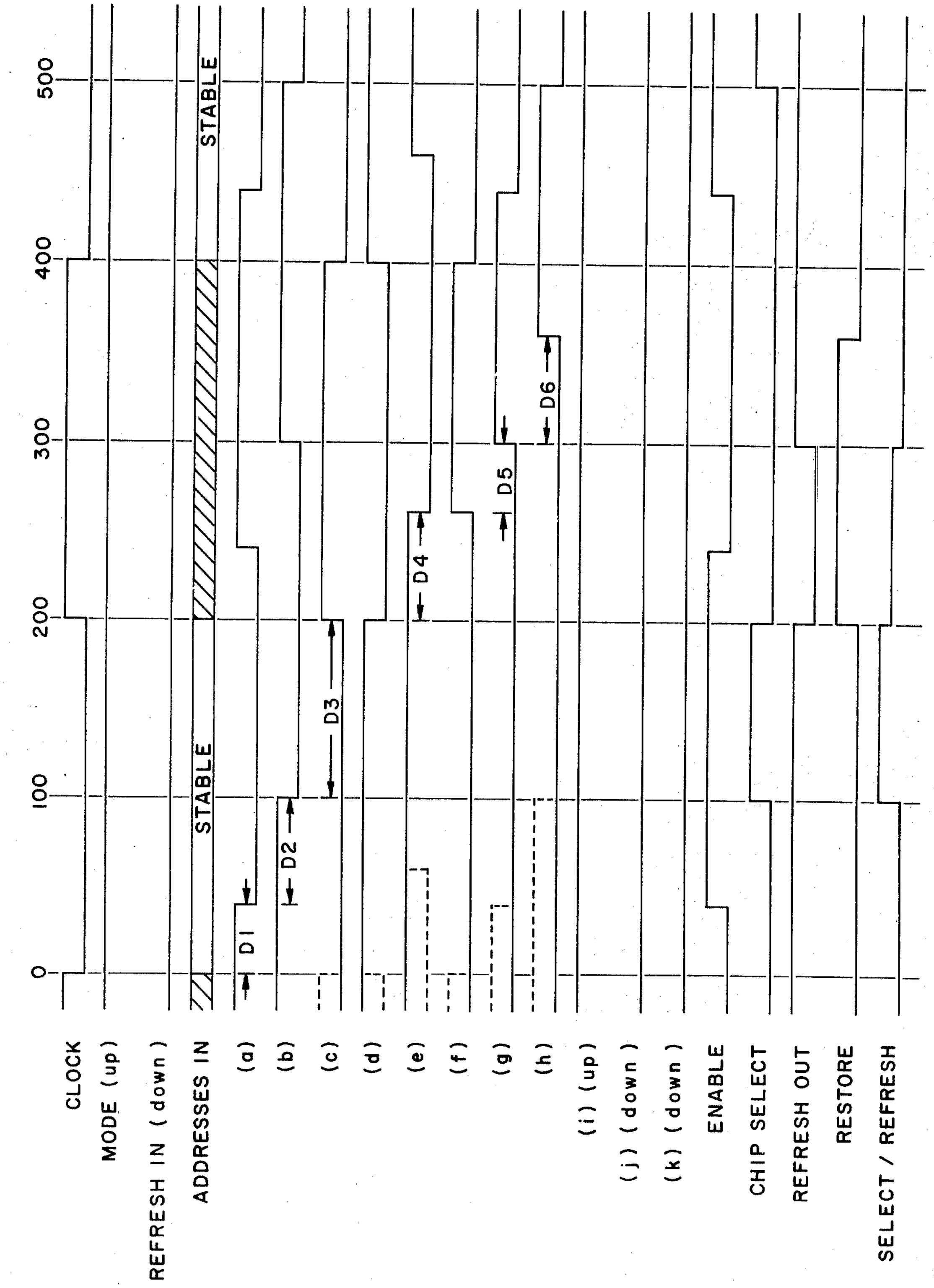
FIG. 9 is a timing diagram which will be helpful in understanding the automatic mode of operation.

FIG. 9 depicts the waveform sequences when the system is operated in the automatic mode. In this case, a refresh pulse follows the select pulse in every cycle and each cycle has a duration of 400 nanoseconds rather than 300 nanoseconds. The advantage, however, of operating in the automatic mode is that externally generated refresh inputs are not required.

A negative 200-nanosecond clock pulse is generated at the start of each cycle as shown in FIG. 9. In the automatic mode, the mode input is fixed at a high level, and the refresh input is fixed at a low level.

The address inputs must be stable during the generation of each clock pulse as in the case of the fast mode of operation. Similarly, waveforms (*a*), (*b*) and (*c*) are similar to the waveforms contained in FIG. 8 — each is delayed respectively by 40, 100 and 200 nanoseconds, with the width of each pulse now being 200 nanoseconds rather than 150 nanoseconds, following the width of the clock pulse.

Since the refresh input is low, the in-phase output of buffer B5 is similarly low. But the mode input is high and thus the output (*j*) of gate A3 is permanently low. Since the output of gate A3 is extended to one input of gate A1, the output of gate A1, waveform (*d*), is high only when waveform (*c*) is low. This is shown in FIG. 9 where waveforms (*c*) and (*d*) are the inverses of each other. Signal (*e*) is the same as signal (*d*) except that it is delayed by 60 nanoseconds. The output (*f*) of gate A2 is high only when waveforms (*d*) and (*e*) are both low. This occurs only between times 260 and 400 as shown in FIG. 9. Signals (*g*) and (*h*) are the same as signal (*f*) except that they are delayed respectively by 40 and 100 nanoseconds.

Since the refresh input is permanently low, the out-of-phase output (*i*) of buffer B5 is permanently high. Since this output is one input of gate A4, the output (*k*) of this gate is permanently low.

The enable pulse is generated 40 nanoseconds after the clock pulse appears at the input of buffer B1. In both modes of operation, the enable pulse is generated 40 nanoseconds after the leading edge of the clock pulse and has the same width as the clock pulse. Similarly, the chip select pulse is a function only of the clock pulse since it is controlled by signals (*b*) and (*c*), and each of these signals is determined solely by the clock pulse. The chip select pulse is high only when both of signals (*b*) and (*c*) are low, between times 100 and 200 in each cycle.

In the fast mode of operation, the refresh input is ordinarily high and a refresh pulse is generated only when it goes low. In the automatic mode of operation, the refresh input is permanently low and it is this fact which allows a refresh pulse to be generated during every system cycle. Because the refresh input is permanently low, the in-phase output of buffer B5, connected to one input of gate A7, is permanently low. Thus the refresh output of gate A7 can go low when the other two inputs to the gate, signals (*d*) and (*g*), go low. The only time that both of these signals are low are between times 200 and 300. Consequently, the refresh output goes low for 100 nanoseconds during every cycle.

Because the output of gate A4, connected to one input of gate A8, is permanently low, the output of gate A8 can go high whenever its other two inputs go low. Thus a positive restore pulse is generated whenever signals (*d*) and (*h*) go low. This occurs between times 200 and 340. Thus, a 140-nanosecond restore pulse is generated during every system cycle.

It is important to note that the refresh output pulse always follows the chip select pulse during every cycle. The bi-level driver operates to generate a high-level select pulse whenever the chip select input is high and address inputs $A_0$–$A_2$ are also high. Thus the select portion of the select/refresh pulse is shown occurring coextensive with the chip select pulse in FIG. 9. The bi-level driver functions to generate a lower level refresh pulse whenever the refresh input is low and the restore input is high. Since the refresh output goes low together with the termination of the chip select pulse, and the restore output goes high at the same time, the lower-level refresh pulse is generated immediately after the select pulse. It should be noted that the restore pulse does not terminate until after the refresh pulse has terminated. As described in the Allen et al application, the restore pulse, extended to the chip array, should be longer than the refresh pulse.

The system of FIG. 1 is designed to accept TTL input signal levels and to generate outputs at TTL levels. However, TTL logic is not used throughout the system. The various pulses required for the proper system operation are produced with the use of delay lines. When two delay lines are in series, it is most convenient to use a single delay line package which is provided with a tap. Thus delay element pair D1 and D2, and delay elements pair D5 and D6, are preferably each a single delay element with a tap separating it into two parts — 40 nanoseconds and 60 nanoseconds. At each tap the delayed signal is fed to the input of a logic stage. TTL logic stages have relatively low input impedences and can cause reflections in the delay line. Similar remarks apply to the logic elements connected at the end of each delay line. To prevent such reflections, and the resulting possible erroneous operation of the system, ECL logic stages, with their high input impedances, are used. Thus the input signals are converted to ECL levels which are then operated upon, and the resulting ECL level signals are then converted to TTL levels for application to the outputs.

Although each delay line could theoretically feed TTL logic stages provided with emitter follower (high input impedance) input stages, the use of an ECL input stage followed by a TTL logic circuit results in the dissipation of more power.

In the fast mode, except during a refresh operation, the restore pulses are shorter than the restore pulses in the automatic mode of operation. The restore output is high only when the three inputs of gate A8 are all low. In both modes, the restore pulse begins 200 nanoseconds after the leading edge of the clock pulse, and the restore pulse goes low once again when one of the three inputs of gate A8 goes high. While signal (*k*), one of the inputs to gate A8, is permanently low in the automatic mode of operation, in the fast mode signal (*k*) goes high only 60 nanoseconds after the leading edge of the restore pulse. It is signal (*k*) going high that shortens the restore pulse in the fast mode of operation. Signal (*k*) is made to go high when signal (*e*), coupled to one input of gate A4, goes low. And signal (*e*) goes low (at time 260) after the leading edge of the clock pulse has been delayed by delay elements D1, D2, D3 and D4.

In the automatic mode, the restore pulse extends between time 200 and 360. Signal (*k*) does not go high and instead the end of the restore pulse is signalled by waveform (*h*) going high. The restore pulse is generated by gate A8. One input to the gate is signal (*d*) and the other is signal (*h*), with signal (*h*) being the same as signal (*d*) except that it is delayed by the cumulative delays of elements D4, D5 and D6 (160 nanoseconds).

The restore pulse is high only as long as both of the (*d*) and (*k*) inputs are low. Since it is the leading edge of the negative (*d*) pulse, after it is delayed by 160 nanoseconds, that causes the restore pulse to terminate, and the restore pulse can be generated only as long as the (*d*) input to gate A8 is low, it is apparent that wave form (*d*) must remain low at least 160 nanoseconds after it goes low in the automatic mode. It is for this reason that in the automatic mode the clock pulse must be at least 160 nanoseconds in width. However, in the fast mode, the termination of the restore pulse is controlled by waveform (*k*) going high — before delay elements D5 and D6 have operated on the clock pulse. The restore pulse is only 60 nanoseconds in width and it is not necessary for the clock pulse to be at least 160 nanoseconds wide. The minimum clock pulse width is determined by the operation of gate A6. The chip select output goes high only when signals (*b*) and (*c*) are both low. Signal (*c*) remains low for 100 nanoseconds after signal (*b*) goes low as a result of the delay introduced by delay element D3. It is when signal (*c*) goes high that the chip select pulse should terminate. But the chip select pulse can be generated for 100 nanoseconds only if signal (*b*) remains low for 100 nanoseconds after it first goes low. Thus the clock pulse must be at least 100 nanoseconds in width. As a margin of safety, a clock pulse width of 150 nanoseconds is provided.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. A timing system for controlling refresh operations in a dynamic MOS memory cell array comprising means for generating refresh pulses for extension to said array, and means for selectively controlling the generation of said refresh pulses during every system cycle and during only selected system cycles.

2. A timing system in accordance with claim 1 further including means for detecting the mode in which said timing system should be operated, and means responsive to said detecting means for controlling a first mode of operation in which refresh pulses are generated during every system cycle and a second mode of operation in which refresh pulses are generated during only selected system cycles.

3. A timing system in accordance with claim 2 further including means for detecting when a refresh pulse should be generated while said system is operating in said second mode, and means responsive to the operation of said refresh pulse detecting means for identifying selected cycles in which refresh pulses should be generated.

4. A timing system for controlling refresh operations in a dynamic MOS memory cell array comprising means for generating refresh pulses for extension to said array, and means for selectively controlling the generation of said refresh pulses at a selected one of at least two rates.

5. A timing system in accordance with claim 4 further including means for detecting the mode in which said timing system should be operated, and means responsive to said detecting means for controlling a first mode of operation in which refresh pulses are generated at a first rate and a second mode of operation in which refresh pulses are generated at a second rate.

6. A timing system in accordance with claim 5 wherein said refresh pulse generating means is normally operative in said first mode for generating refresh pulses at a first rate, and further including means for detecting when refresh pulses should be generated at a second, slower rate while said system is operating in said second mode.

7. A timing system in accordance with claim 4 wherein said refresh pulse generating means is normally operative in a first mode for generating refresh pulses at a first rate, and further including means for detecting when refresh pulses should be generated at a second, slower rate while said system is operating in a second mode.

8. A timing system in accordance with claim 7 further including means for generating restore pulses for extension to said array during every data operation cycle, and means for causing said restore pulses to have a first duration in those cycles when refresh pulses are not generated and a second, longer duration in those cycles when refresh pulses are generated.

9. A timing system in accordance with claim 8 further including a plurality of input terminals, a plurality of output terminals for connection to said array, a first plurality of logic circuits connected to said input terminals for converting TTL input signal levels to ECL signal levels, a second plurality of logic circuits connected to said output terminals for converting ECL signal levels to TTL output levels, and a third plurality of logic circuits interconnecting said first and second pluralities of logic circuits, said third plurality of logic circuits including at leaSt one delay line having a tap thereon and a logic circuit connected to said tap.

10. A timing system in accordance with claim 4 further including means for generating restore pulses for extension to said array during every data operation cycle, and means for causing said restore pulses to have a first duration in those cycles when refresh pulses are not generated and a second, longer duration in those cycles when refresh pulses are generated.

11. A timing system in accordance with claim 10 further including a plurality of input terminals, a plurality of output terminals for connection to said array, a first plurality of logic circuits connected to said input terminals for converting TTL input signal levels to ECL signal levels, a second plurality of logic circuits connected to said output terminals for converting ECL signal levels to TTL output signal levels, and a third plurality of logic circuits interconnecting said first and second pluralities of logic circuits, said third plurality of logic circuits including at least one delay line having a tap thereon and a logic circuit connected to said tap.

* * * * *